US011109084B2

(12) United States Patent
Singhai et al.

(10) Patent No.: US 11,109,084 B2
(45) Date of Patent: Aug. 31, 2021

(54) MACHINE-LEARNING BASED MULTI-STEP ENGAGEMENT STRATEGY GENERATION AND VISUALIZATION

(71) Applicant: Adobe Inc., San Jose, CA (US)

(72) Inventors: Pankhri Singhai, Rohini (IN); Sundeep Parsa, San Jose, CA (US); Piyush Gupta, Noida (IN); Nikaash Puri, New Delhi (IN); Eshita Shah, San Francisco, CA (US); Balaji Krishnamurthy, Noida (IN); Nupur Kumari, Noida (IN); Mayank Singh, Noida (IN); Akash Rupela, Rohini (IN)

(73) Assignee: Adobe Inc., San Jose, CA (US)

( * ) Notice: Subject to any disclaimer, the term of this patent is extended or adjusted under 35 U.S.C. 154(b) by 10 days.

(21) Appl. No.: 16/694,612

(22) Filed: Nov. 25, 2019

(65) Prior Publication Data

US 2020/0092593 A1    Mar. 19, 2020

Related U.S. Application Data

(63) Continuation of application No. 16/057,729, filed on Aug. 7, 2018, now Pat. No. 10,609,434.

(51) Int. Cl.
*H04N 21/25* (2011.01)
*H04N 21/2668* (2011.01)
(Continued)

(52) U.S. Cl.
CPC .......... *H04N 21/251* (2013.01); *G06N 20/00* (2019.01); *G06Q 30/0244* (2013.01);
(Continued)

(58) Field of Classification Search
CPC .......... H04N 21/251; H04N 21/25891; H04N 21/2668; H04N 21/4755; H04N 21/812;
(Continued)

(56) References Cited

U.S. PATENT DOCUMENTS 5,398,300 A    3/1995    Levey
8,078,617 B1   12/2011   Neveitt et al.
(Continued)

FOREIGN PATENT DOCUMENTS

WO    WO-2018084867    5/2018

OTHER PUBLICATIONS

"Corrected Notice of Allowability", U.S. Appl. No. 16/057,729, dated Mar. 6, 2020, 2 pages.
(Continued)

*Primary Examiner* — Jefferey F Harold
*Assistant Examiner* — Alexander Boyd
(74) *Attorney, Agent, or Firm* — FIG. 1 Patents

(57) ABSTRACT

Machine-learning based multi-step engagement strategy generation and visualization is described. Rather than rely heavily on human involvement to create delivery strategies, the described learning-based engagement system generates multi-step engagement strategies by leveraging machine-learning models trained using data describing historical user interactions with content delivered in connection with historical campaigns. Initially, the learning-based engagement system obtains data describing an entry condition and an exit condition for a campaign. Based on the entry and exit condition, the learning-based engagement system utilizes the machine-learning models to generate a multi-step engagement strategy, which describes a sequence of content deliveries that are to be served to a particular client device user (or segment of client device users). Once the multi-step engagement strategies are generated, the learning-based engagement system may also generate visualizations of the strategies that can be output for display.

20 Claims, 7 Drawing Sheets

(51) Int. Cl.
*H04N 21/258* (2011.01)
*H04N 21/475* (2011.01)
*G06N 20/00* (2019.01)
*H04N 21/81* (2011.01)
*G06Q 30/02* (2012.01)

(52) U.S. Cl.
CPC ..... *G06Q 30/0255* (2013.01); *G06Q 30/0271* (2013.01); *H04N 21/25891* (2013.01); *H04N 21/2668* (2013.01); *H04N 21/4755* (2013.01); *H04N 21/812* (2013.01)

(58) Field of Classification Search
CPC ............... G06N 20/00; G06Q 30/0244; G06Q 30/0255; G06Q 30/0271
See application file for complete search history.

(56) References Cited

U.S. PATENT DOCUMENTS

| | | | |
|---|---|---|---|
| 10,311,368 | B2 | 6/2019 | Lokare et al. |
| 10,581,887 | B1 | 3/2020 | Dinerstein |
| 10,609,434 | B2 | 3/2020 | Singhai et al. |
| 10,824,951 | B2 | 11/2020 | Yan et al. |
| 10,824,959 | B1 | 11/2020 | Chatterjee et al. |
| 2006/0218108 | A1 | 9/2006 | Panfilov et al. |
| 2011/0231256 | A1 | 9/2011 | Wang et al. |
| 2011/0288907 | A1 | 11/2011 | Harvey et al. |
| 2012/0191531 | A1 | 7/2012 | You et al. |
| 2012/0221416 | A1* | 8/2012 | Baiz Matuk ........... G06Q 30/02 705/14.66 |
| 2013/0326375 | A1 | 12/2013 | Barak et al. |
| 2014/0222737 | A1 | 8/2014 | Chen et al. |
| 2014/0337271 | A1 | 11/2014 | Cox et al. |
| 2015/0278877 | A1* | 10/2015 | Yi ...................... G06Q 30/0275 705/14.71 |
| 2016/0134934 | A1* | 5/2016 | Jared ................ H04N 21/44213 725/14 |
| 2017/0034592 | A1* | 2/2017 | Ray ...................... H04N 21/812 |
| 2017/0201779 | A1 | 7/2017 | Publicover et al. |
| 2017/0293849 | A1 | 10/2017 | Hodjat et al. |
| 2018/0018155 | A1* | 1/2018 | Sanan ................. G06F 16/9535 |
| 2018/0018590 | A1 | 1/2018 | Szeto et al. |
| 2018/0083996 | A1 | 3/2018 | Hodjat |
| 2018/0158552 | A1 | 6/2018 | Liu et al. |
| 2018/0268291 | A1 | 9/2018 | Turner et al. |
| 2018/0322395 | A1 | 11/2018 | Shahrzad et al. |
| 2019/0147369 | A1 | 5/2019 | Gupta et al. |
| 2020/0051118 | A1 | 2/2020 | Singhai et al. |
| 2020/0053403 | A1 | 2/2020 | Singhai et al. |
| 2020/0126664 | A1 | 4/2020 | Sato |
| 2020/0167691 | A1 | 5/2020 | Golovin et al. |
| 2020/0322662 | A1 | 10/2020 | Korte et al. |

OTHER PUBLICATIONS

"Final Office Action", U.S. Appl. No. 16/057,743, dated Dec. 3, 2020, 34 pages.
"First Action Interview Office Action", U.S. Appl. No. 16/057,743, dated Oct. 7, 2020, 3 pages.
"Pre-Interview First Office Action", U.S. Appl. No. 15/812,991, dated Dec. 15, 2020, 4 pages.
"Combined Search and Examination Report", GB Application No. 1814706.6, dated Mar. 12, 2019, 6 pages.
"First Action Interview Office Action", U.S. Appl. No. 16/057,729, dated Oct. 29, 2019, 3 pages.
"Notice of Allowance", U.S. Appl. No. 16/057,729, dated Nov. 20, 2019, 5 pages.
"Pre-Interview First Office Action", U.S. Appl. No. 16/057,729, dated Sep. 11, 2019, 3 pages.
Cook,"Residuals and Influence in Regression", (New York: Chapman and Hall, 1982) Retrieved at: https://conservancy.umn.edu/handle/11299/37076—on Sep. 14, 2017, 1982, 237 pages.
Fidelis,"Discovering Comprehensible Classification Rules with a Genetic Algorithm", In Evolutionary Computation, 2000. Proceedings of the 2000 Congress on, vol. 1, Jul. 2000, 6 pages.
Fisher,"The Use of Multiple Measurements in Taxonomic Problems", Annals of Human Genetics, vol. 7, Issue 2, Sep. 1936, 10 pages.
Ghosh,"Mining Frequent Itemsets Using Genetic Algorithm", International Journal of Artificial Intelligence & Applications (IJAIA), vol. 1, Oct. 2010, 11 pages.
Hall,"Ideas on interpreting machine learning", Retrieved at: https://www.oreilly.com/ideas/ideas-on-interpreting-machine-learning, Mar. 15, 2017, 70 pages.
Hastie,"Generalized Additive Models", Comment. Statist. Sci., vol. 1, No. 3. (1986), Aug. 1986, 14 pages.
Lakkaraju,"Interpretable Decision Sets: A Joint Framework for Description and Prediction", In Proceedings of the 22nd ACM SIGKDD International Conference on Knowledge Discovery and Data Mining, Aug. 2016, 10 pages.
Letham,"Interpretable classifiers using rules and Bayesian analysis: Building a better stroke prediction model", dated Nov. 5, 2015, 23 pages.
Lundberg,"An unexpected unity among methods for interpreting model predictions", dated Dec. 8, 2016, 6 pages.
Ribeiro,""Why Should I Trust You?" Explaining the Predictions of Any Classifier", In Proceedings of the 22nd ACM SIGKDD International Conference on Knowledge Discovery and Data Mining, Aug. 7, 2016, 10 pages.
Sharma,"Discovery of Classification Rules using Distributed Genetic Algorithm", Jul. 2000, 9 pages.
"Pre-Interview First Office Action", U.S. Appl. No. 16/057,743, dated Aug. 3, 2020, 3 pages.
"Restriction Requirement", U.S. Appl. No. 16/057,743, dated May 22, 2020, 6 pages.
"Non-Final Office Action", U.S. Appl. No. 15/812,991, dated Mar. 8, 2021, 27 pages.
"Notice of Allowance", U.S. Appl. No. 16/057,743, dated Apr. 15, 2021, 11 pages.
Shakeel, U. et al., "Leveraging Cloud-Based Predictive Analytics to Strengthen Audience Engagement", SMPTE Motion Imaging Journal, vol. 125, No. 8 [retrieved Apr. 8. 2021]. Retrieved from the Internet <https://doi.org/10.5594/JMI.2016.2602121>., Oct. 2016, 9 pages.
"Final Office Action", U.S. Appl. No. 15/812,991, dated Jun. 28, 2021, 34 pages.
"Foreign Office Action", GB Application No. 1814706.6, dated May 28, 2021, 5 pages.
"Foreign Office Action", GB Application No. 1814706.6, dated Mar. 5, 2021, 6 pages.
"Pre-Interview First Office Action", U.S. Appl. No. 16/687,182, dated Jun. 18, 2021, 32 pages.
Alufaisan, Yasmeen et al., "From Myths to Norms: Demystifying Data Mining Models with Instance-Based Transparency", 2017 IEEE 3rd International Conference on Collaboration and Internet Computing (CIC) [retrieved Jun. 28, 2021], Retrieved from the Internet <https://doi.org/10.1109/CIC.2017.00042>., Oct. 2017, 10 pages.
Ribeiro, Marco T et al., "Model-Agnostic Interpretability of Machine Learning", Cornell University, arXiv Preprint, arXiv.org [retrieved Jun. 28, 2021], Retrieved from the Internet <https://arxiv.org/pdf/1606.05386>., Jun. 16, 2016, 5 pages.

* cited by examiner

MACHINE-LEARNING BASED MULTI-STEP ENGAGEMENT STRATEGY GENERATION AND VISUALIZATION

RELATED APPLICATION

This application is a continuation of and claims priority to U.S. patent application Ser. No. 16/057,729, filed Aug. 7, 2018, which is incorporated by reference herein in its entirety.

BACKGROUND

Digital advertising systems continue to make advances in computing technologies to target digital advertising to consumers. With these advances, digital advertising systems are able to increasingly personalize digital advertising, such that consumers served digital advertisements have begun to think and/or say "I do want this [product or service that is the focus of the served digital advertising], but how do 'they' know?" Regardless of whether digital advertising systems are capable of accurately predicting products and services desired by client device users and serving them digital advertising for those products and services, digital advertising systems also attempt to optimize (e.g., maximize) conversion of these client device users in relation to the products and services. Generally speaking, "conversion" refers to an act of consumers to follow through with a desired action, such as to purchase a product or service or engage with a desired experience. Examples of conversion include interaction of a consumer to engage with the digital content (e.g., click a link), purchase a product or service that pertains to the digital content, and so forth.

Conventional digital advertising systems attempt to optimize conversion in different ways, such as by configuring communications with different digital content components (e.g., images, videos) for different user segments, predicting times to send communications (e.g., emails) to client device users, predicting user fatigue, and so forth. However, conventional digital advertising systems rely heavily on the involvement of users (e.g., marketers) for creating strategies to deliver content to client device users targeted by marketing campaigns, such as in connection with creating strategies for delivering content to particular groups of client device users over a life of a campaign. Human users simply are incapable of processing the vast amount of data available which describes client device users and their interactions with deliveries of previous campaigns. By relying on the involvement of human users, conventional digital advertising systems thus deliver content according to strategies that are based on information that is, at best, incomplete, but may also be biased or simply inaccurate, e.g., because it is practically, if not actually, impossible for a human to process the amount of data that is pertinent to delivering content to targeted client device users.

SUMMARY

To overcome these problems, multi-step engagement strategy generation and visualization is leveraged in a digital medium environment. Rather than rely heavily on human involvement to create delivery strategies, the described learning-based engagement system generates multi-step engagement strategies by leveraging machine-learning models trained using data describing historical user interactions with content delivered in connection with historical campaigns. By contrast, users that create such strategies on their own may merely provide their "best guess" based on domain knowledge as to the aspects of the sequence that will optimize conversion. Importantly, the learning-based engagement system is able to leverage and make determinations based on an amount of data that is practically, if not actually, impossible for a human to process. Initially, the learning-based engagement system obtains data describing an entry condition and an exit condition for a campaign. Based on the entry and exit condition, the learning-based engagement system utilizes the machine-learning models to generate a multi-step engagement strategy, which describes a sequence of content deliveries that are to be served to a particular client device user (or segment of client device users). These machine-learning models are also trained to generate predictions of multi-step engagement strategies that optimize performance of an action corresponding to the exit condition across client device users targeted by the campaign. Once the multi-step engagement strategies are generated, the learning-based engagement system may also generate visualizations of the strategies that can be output for display, e.g., to a marketer that provided input specifying the entry and exit conditions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
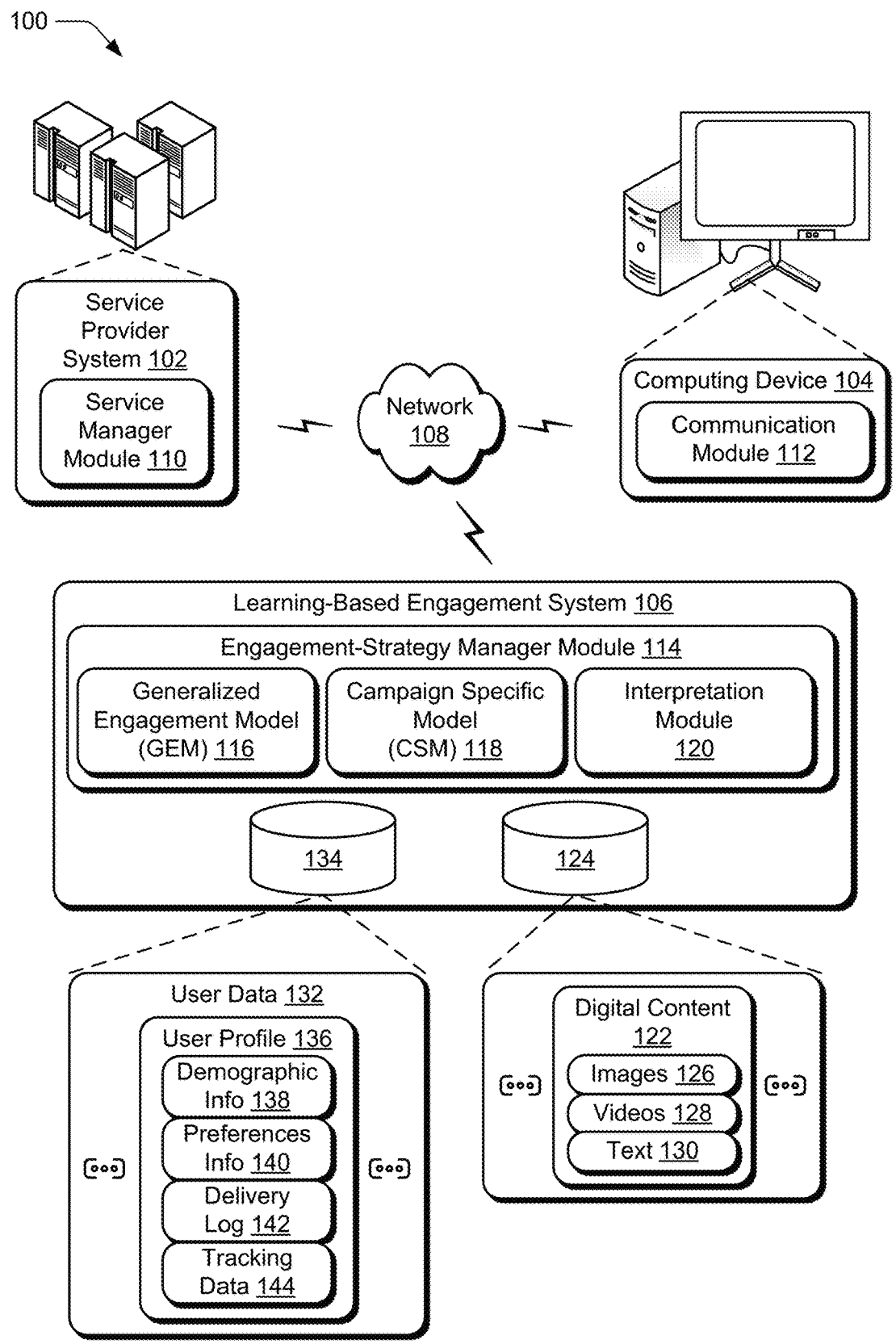
FIG. 1 is an illustration of an environment in an example implementation that is operable to employ techniques described herein.

Digital advertising systems continue to make advances in computing technologies to target digital advertising to consumers. With these advances, digital advertising systems are able to increasingly personalize digital advertising, in part, by predicting products and services desired by client device users and serving them digital advertising for those products and services. Digital advertising systems also attempt to optimize (e.g., maximize) conversion of these client device users in relation to the products and services, such as to cause these users to purchase a product or service. Conventional digital advertising systems attempt to optimize conversion in different ways, such as by configuring communications with different digital content components (e.g., images, videos) for different user segments, predicting times to send communications (e.g., emails) to client device users, predicting user fatigue, and so forth. However, conventional digital advertising systems rely heavily on the involvement of users (e.g., marketers) for creating strategies to deliver content to client device users targeted by marketing campaigns. By relying on the involvement of human users, conventional digital advertising systems thus deliver content according to strategies that are based on information that is, at best, incomplete, but may also be biased or simply inaccurate, e.g., because it is practically, if not actually, impossible for a human to process the amount of data that is pertinent to delivering content to targeted client device users.

To overcome these problems, multi-step engagement strategy generation and visualization is leveraged in a digital medium environment. Rather than rely heavily on human involvement to create delivery strategies, the described learning-based engagement system generates multi-step engagement strategies by leveraging machine-learning models trained using data describing historical user interactions with content delivered in connection with historical campaigns. By contrast, users that create such strategies on their own may merely provide their "best guess" based on domain knowledge as to the aspects of the sequence that will optimize conversion. Importantly, the learning-based engagement system is able to leverage and make determinations based on an amount of data that is practically, if not actually, impossible for a human to process. Initially, the learning-based engagement system obtains data describing an entry condition and an exit condition for a campaign. Based on the entry and exit condition, the learning-based engagement system utilizes the machine-learning models to generate a multi-step engagement strategy.

Broadly speaking, a multi-step engagement strategy controls content delivery in connection with a campaign, such as by controlling the client device users that are targeted for receipt of content associated with the campaign, sequences of content deliveries that are served to each of the targeted client device users, actions that result in the targeted client device users no longer being targeted by the campaign, and so forth. To initiate creation of this new multi-step engagement strategy, an engagement-system user may be relied upon merely for providing input via a user interface associated with the learning-based engagement system to define the entry and exit conditions. This contrasts with conventional systems which rely on users to provide further strategy information, which may be based on their limited domain knowledge, such as how many content deliveries to make to different users, times at which to deliver content, and so forth. Instead, the learning-based engagement system computes sequences of content deliveries that are to be served to targeted client device users using simply the entry and exit conditions input by the engagement-system user and also by leveraging the machine learning model.

The entry condition corresponds to an action, that when performed by a client device user, causes the user to become a target for receiving digital content in connection with a respective campaign. Examples of actions that may be leveraged as an entry condition include purchasing a ticket having a level that is less than a "best" level (e.g., an economy ticket when first-class tickets are still available or general admission when premium seating is still available), leaving a brick-and-mortar store without purchasing a product or service, leaving an online store without purchasing a product or service, adding a product or service to an online shopping cart without purchasing the added product or service, and so on.

In contrast, the exit condition corresponds to an action, that when performed by a client device user targeted by the campaign, causes the user to no longer be a target for receiving digital content in connection with the campaign. In other words, the exit condition corresponds to an objective, such that when the exit-condition action is performed the learning-based engagement system has effectively caused conversion of the respective client device user in relation to the objective. Examples of actions that may be leveraged as an exit condition include upgrading from a lower ticket level to a higher ticket level (e.g., upgrading to a first-class ticket or premium seating), returning to a brick-and-mortar store to purchase a product or service, purchasing a product or service from an online store (e.g., associated with brick-and-mortar locations and/or limited to online sales), purchasing a product or service previously added to an online shopping cart but not previously purchased, and so forth.

The sequences of content deliveries each correspond to multiple deliveries of content, which are scheduled for delivery in a defined order. In scenarios where a user creates a multi-step engagement strategy, the creating engagement-system user must provide input via the user interface to define various aspects of these sequences, such as a particular client device user or segment of client device users to which the sequence is targeted, a number of content deliveries of the sequence, the content components included in different deliveries, an order in which the different deliveries are served, days and times for serving the different deliveries, delivery channels (e.g., email, SMS text message, or social networking platform) via which the different deliveries are served, and so on. As noted above, engagement-system users may be able to provide their "best guess" based on domain knowledge as to the aspects of a sequence that will optimize conversion. However, the learning-based engagement system relieves users of this burden by determining different sequences that vary in numerous aspects for achieving optimal performance of the exit condition.

In contrast to a "best guess," the learning-based engagement system leverages machine learning models that are trained using data describing historical user interactions with content delivered in connection with historical campaigns, e.g., data describing actual behaviors of users with real content deliveries. These machine-learning models are also trained to generate predictions of multi-step engagement strategies that optimize performance of an action corresponding to the exit condition by client device users targeted by the campaign. Once the multi-step engagement strategies are produced, the learning-based engagement system generates visualizations of the strategies that can be output for display, e.g., to a marketer that provided input specifying the entry and exit conditions.

Additionally, the learning-based engagement system is capable of modifying a multi-step engagement strategy as it is deployed using machine learning. Based on tracked interactions of users with content delivered in connection with the campaign, for instance, the learning-based engagement system is capable of optimizing performance of the exit condition among targeted client device users given real-time interactions with the delivered content. By way of example, the learning-based engagement system modifies aspects of a content-delivery sequence such as a number of deliveries to a particular client device user, whether or not to serve content to this user, an order of delivering different content, content components included in the different deliveries, time of day to serve the deliveries, channels via which to serve the deliveries, and so on.

Due at least in part to leveraging the vast amount of data that describes users and their interactions with actual content deliveries, the learning-based engagement system can generate engagement-strategies in real-time that are effective to optimize performance of an exit condition based on actual user behavior rather than on incomplete domain knowledge. When such a multi-step engagement strategy is deployed, its multiple content deliveries personalize a journey of a client device user through a campaign from end-to-end, e.g., from entry into the campaign by satisfying the entry condition, during the campaign while receiving a personalized sequence of communications, and until exit from the campaign by satisfying the exit condition. Due to the personalization of this journey, client device users that receive content deliveries according to multi-step engagement strategies develop less fatigue with a respective organization.

Term Descriptions

As used herein, the term "multi-step engagement strategy" refers to data that defines a sequence of different content deliveries to a single client device user or a segment of client device users, such that a single client device user is delivered multiple content deliveries according to a given multi-step engagement strategy. Each delivery of the sequence may be configured differently in terms of the particular content components included in the delivery, a channel via which the content is delivered, a time at which the content is delivered (e.g., both day of the week, time of day, days and since being targeted by a campaign), format of the delivered content, and so forth.

These differences in what, how, and when the content is delivered may be controlled by delivery "aspects." As used herein, a delivery "aspect" refers to a configurable characteristic of a content delivery, controlling what content is delivered to a client device as well as how and when the content is delivered. The described systems may control a variety of aspects of content delivery without departing from the spirit or scope of the techniques described herein.

The term "client device user" refers generally to a user of a client computing device that is targeted by content deliveries which are controlled by a multi-step engagement strategy, e.g., a recipient of the content deliveries. As used herein, client device users may also refer to users that interact with digital content in such a way as to be candidates for targeting by a multi-step engagement strategy, e.g., if such interactions satisfy an entry condition of a campaign. Indeed, while a client device user is targeted by the content deliveries, the content is actually communicated to and ultimately presented via a client device associated with the user.

In contrast, the term "engagement-system user" refers to a user of a learning-based engagement system as described above and below. In accordance with the techniques described herein, the engagement-system user may provide input to the engagement system via a computing device to specify content deliveries for user-created multi-step engagement strategies, to cause the engagement system to automatically determine the content deliveries for multi-step engagement strategies, view multi-step engagement strategies generated automatically or modified by the engagement system, and so forth. By way of example, an engagement-system user may be a marketer for a company selling products or services and client device users may be targeted by the engagement-system user as potential consumers of the products or services offered for sale by the company.

As used herein, the term "entry condition" refers to an action, that when performed by a client device user, causes the user to become a target for receiving digital content in connection with a particular campaign. Examples of actions that may be specified as entry conditions include, but are not limited to, purchasing a ticket having a level that is less than a "best" level (e.g., an economy ticket when first-class tickets are still available or general admission when premium seating is still available), leaving a brick-and-mortar store without purchasing a product or service, leaving an online store without purchasing a product or service, adding a product or service to an online shopping cart without purchasing the added product or service, viewing an advertisement, interacting with digital content corresponding to a product or service for sale, signing up to receive information from a company, and so on.

As used herein, the term "exit condition" refers to an action, that when performed by a client device user, causes the user to no longer be a target for receiving digital content in connection with a particular campaign. Examples of actions that may be specified as exit conditions include, but are not limited to, upgrading from a lower ticket level to a higher ticket level (e.g., upgrading to a first-class ticket or premium seating), returning to a brick-and-mortar store to purchase a product or service, purchasing a product or service from an online store (e.g., associated with brick-and-mortar locations and/or limited to online sales), purchasing a product or service previously added to an online shopping cart but not previously purchased, purchasing a product or service corresponding to a viewed advertisement, purchasing a product or service corresponding to interacted-with digital content, and so on.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ machine-learning based multi-step engagement strategy generation and visualization as described herein. The illustrated environment 100 includes a service provider system 102, computing device 104, and learning-based engagement system 106 that are communicatively coupled, one to another, via a network 108.

Computing devices that are usable to implement the service provider system 102, computing device 104, and learning-based engagement system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is illustrated as including a service manager module 110 that is representative of functionality to provide services accessible via the network 108 that are usable to make products or services available to consumers. The service manager module 110, for instance, may expose a website or other functionality that is accessible via the network 108 by a communication module 112 of the computing device 104. The communication module 112, for instance, may be configured as a browser, a network-enabled application, and so on that obtains data from the service provider system 102 via the network 108. This data is employed by the communication module 112 to enable a user of the computing device 104 to communicate with the service provider system 102 to obtain information corresponding to the products or services, e.g., web pages with dashboards and analytics tools when the service provider system 102 is a marketing-campaign management service.

In order to personalize the information for client device users that are targeted recipients of a campaign, the service provider system 102 may employ the learning-based engagement system 106. Although functionality of the learning-based engagement system 106 is illustrated as separate from the service provider system 102, this functionality may also be incorporated as part of the service provider system 102, further divided among other entities, and so forth. The learning-based engagement system 106 includes an engagement-strategy manager module 114 that is implemented at least partially in hardware of a computing device to modify personalized multi-step engagement strategies used to deliver content of a campaign. The engagement-strategy manager module 114 is further implemented to generate and train generalized engagement model 116 (GEM 116) and campaign specific model 118 (CSM 118). These models represent functionality to determine multi-segment engagement strategies for different defined segments of user data. Specifically, the GEM 116 represents functionality to determine multi-segment engagement strategies for the different defined segments based on data describing user behavior over multiple historical campaigns. In contrast, the CSM 118 represents functionality to determine multi-segment strategies for the different defined segments based on data describing user behavior over a "current" campaign—a campaign relative to which a current engagement strategy is being deployed. To visualize multi-segment engagement strategies generated or modified using the GEM 116 and the CSM 118, the engagement-strategy manager module 114 leverages functionality of interpretation module 120. The interpretation module 120 is configured as described in application Ser. No. 15/812,991, filed Nov. 14, 2017 and titled "Rule Determination for Black-Box Machine Learning Models," the entire disclosure of which is hereby incorporated by reference.

Broadly speaking, the multi-segment engagement strategies determined using the functionality of the GEM 116 and the CSM 118 describe how to deliver content to particular segments of users, e.g., by specifying at least a number of content deliveries and for each content delivery, a delivery channel, day of the week, and time of day. In one or more implementations, the engagement-strategy manager module 114 uses the multi-segment engagement strategies determined by the GEM 116 and the CSM 118 to deliver to client devices digital content 122, which is illustrated in storage 124, in an attempt to cause users of the client devices to perform a defined action. The defined action corresponds to an exit condition of the campaign; an objective of the campaign as defined by an engagement-system user that interacts with the described system via the computing device 104 to deploy a multi-segment engagement strategy. Examples of such defined actions include, but are not limited to, causing conversion with products or services of the service provider system 102, upgrading from an economy class ticket to a premium class ticket, subscribing to an email distribution list of the service provider system 102, joining a loyalty program of the service provider system 102, and so forth.

In accordance with the described techniques, the GEM 116 learns multi-segment engagement strategies for delivering the digital content 122 in ways that optimize achievement of defined objectives based on one or more machine learning techniques and user interaction data of historical campaigns. The CSM 118 learns strategies for delivering digital content in ways that optimize achievement of a defined objective. In particular, the CSM 118 does so as a particular campaign is underway based on one or more machine learning techniques and user interaction data of the particular campaign. By way of example, the GEM 116 and/or the CSM 118 may comprise a neural network trained based on one or more loss functions and back propagation to optimize delivery of the digital content 122 to client devices in a way that maximize achievement of a defined campaign objective.

The digital content 122 may assume a variety of forms, such as images 126, videos 128, text 130, and so forth. The learning-based engagement system 106 may deliver different images 126, videos 128, text 130, or combinations thereof, to different client devices based on output of the GEM 116 and the CSM 118 that indicates which image 126, video 128, or text 130 to deliver—the output generated based on data describing associated client device users and machine learned "rules." The digital content 122, for instance, is provided to client devices as part of a campaign that is controlled by a personalized multi-step engagement strategy. Data may then be generated based on provision of the digital content 122 to describe which users received which items of the digital content 122 (e.g., in connection with particular engagement strategies) as well as characteristics of the users. This generated data may be included in user data 132, for example.

The user data 132 may also assume a variety of forms without departing from the spirit or scope of the techniques described herein. Broadly speaking, the user data 132, which is illustrated as stored in storage 134, describes characteristics of different client device users. This information is used to describe behaviors of a client device user with delivered digital content via a respective client device and also to tailor information provided to a client device based on particular characteristics of the associated user. This information also describes the characteristics determined about client device users. To this end, the user data 132 is depicted with user profile 136, which represents data describing an individual client device user, e.g., a user authenticated to a client device.

The illustrated example depicts the user profile 136 having demographic information 138 (e.g., age, gender, and location), preferences information 140 (e.g., preferred content delivery channels, content delivery restrictions, and products and services of interest), delivery log 142 (e.g., records of the digital content 122 that has been delivered to the user described by the user profile 136), and tracking data 144 (e.g., data describing interactions of the client device user with the digital content 122 delivered such as opens and clicks). The user data 132 and the user profiles 136 may be configured to include or have access to different information without departing from the spirit or scope of the techniques described herein. By way of example, the user data 132 may include the delivery log 142 describing the digital content 122 delivered to multiple client devices (e.g., hundreds, thousands, and tens- or hundreds-of-thousands), rather than include the delivery log 142 at a user-profile level describing merely the digital content 122 delivered to a single user corresponding to the user profile 136. The user data 132 is further illustrated with ellipses to indicate that the storage 134 is configured to store information for multiple users.

The engagement-strategy manager module 114 not only trains the GEM 116 using historical user data 132, but also trains the CSM 118 during deployment of a campaign. Initially, such a campaign is largely controlled according to an input multi-step engagement strategy. Later, this campaign may be controlled according a multi-step engagement strategy that is modified by the engagement-strategy manager module 114 in real-time as client device users interact with delivered content (or do not interact with it). The GEM 116 and the CSM 118 support advantages in relation to massive record flows, as collecting the user data 132 for hundreds, thousands, and more users typically results in vast amounts of data. Indeed, as the GEM 116 and CSM 118 are trained using more of the user data 132, these models are able to more accurately predict user interactions with content in substantially real-time. This user data 132 can include an amount of data that would be inefficient, to the point of near-impossibility, to simply process under 'brute force' with a general-purpose computer. Instead, the GEM 116 and the CSM 118 effectively reduce the collected user data 132, e.g., to learned weights of different nodes at different layers of a corresponding neural network.

The engagement-strategy manager module 114 can configure the GEM 116 and the CSM 118 using any type of machine-learning technique to enable prediction of multi-step engagement strategies for optimizing a campaign exit condition. According to various implementations, such a machine-learning model uses supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. In any case, the engagement-strategy manager module 114 may use machine-learning techniques to continually train and update the GEM 116 and the CSM 118 (or, in other words, to update a trained machine-learning model) to accurately predict user behaviors and strategies for optimizing a desired objective.

The interpretation module 120 represents functionality to determine rules for machine-learned models, such as the GEM 116 and the CSM 118. In one or more implementations, these rules are configured as if-then statements specifying data that a machine-learning model outputs given particular input data. Given data describing client device users targeted by a respective campaign and their interactions with data delivered in connection with the campaign, for instance, the GEM 116 and the CSM 118 each output an indication of a multi-step engagement strategy to use for further delivery of content. By way of example, the GEM 116 and the CSM 118 output data identifying one of a plurality of strategies, e.g., a first strategy, a second strategy, and so forth. In contrast, the interpretation module 120 outputs human-readable rules as if-then statements such as 'IF 10≤age<25 AND state=California THEN Predict class_1'. Here, 'class_1' corresponds to a particular multi-step engagement strategy that is known.

As described in more detail below, the engagement-strategy manager module 114 generates visualizations indicative of the multi-step engagement strategies produced by the GEM 116 and the CSM 118 based on the rules output by the interpretation module 120. For instance, the engagement-strategy manager module 114 generates these visualizations to indicate user segments identified by the rules (e.g., users between 10 and 25 and from California) and lists a sequence of communications corresponding to the particular multi-step engagement strategies identified by the rules e.g., the sequence of communications associated with 'class_1'.

Having considered an example environment, consider now a discussion of some example details of the techniques for machine-learning based multi-step engagement strategy generation and visualization in a digital medium environment in accordance with one or more implementations.

ML-Based Multi-Step Engagement Strategy
Generation and Visualization

Figure 2:
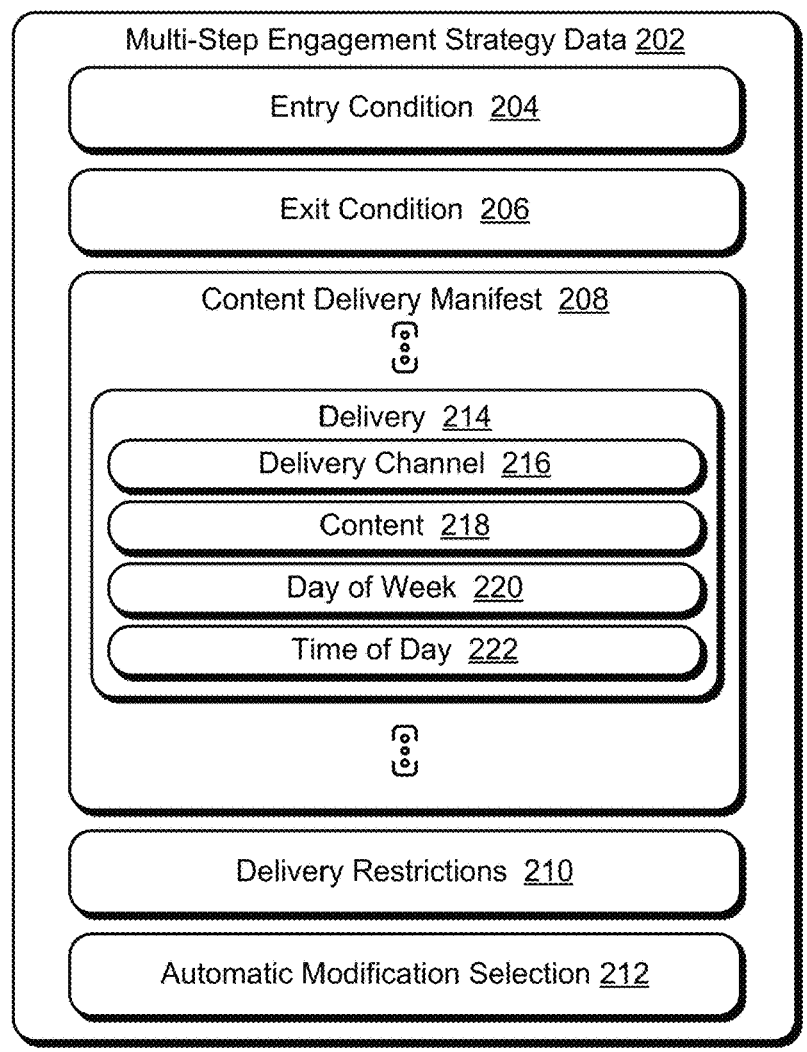
FIG. 2 depicts an example implementation of data describing a multi-step engagement strategy for delivering content of a campaign.

FIG. 2 depicts an example implementation 200 of data describing a multi-step engagement strategy usable for delivering content of a campaign. In the illustrated example 200, multi-step engagement strategy data 202 includes entry condition 204, exit condition 206, content delivery manifest 208, delivery restrictions 210, and automatic modification selection 212. It should be appreciated that the multi-step engagement strategy data 202 is one example of data that can be used to describe various aspects for implementing a multi-step engagement strategy. Indeed, data may be configured in a variety of other ways to describe various aspects for implementing a multi-step engagement strategy without departing from the spirit or scope of the techniques described herein.

In relation to the illustrated example 200, though, the multi-step engagement strategy data 202 is usable to implement multi-step engagement strategies created by engagement-system users (e.g., marketers) as well as those created by the engagement-strategy manager module 114. The engagement-strategy manager module 114 can be leveraged to create an entire multi-step engagement strategy based on user input describing solely the entry condition 204 and the exit condition—though inputs describing delivery restrictions may also be leveraged. The multi-step engagement strategy data 202 is also usable to implement multi-step engagement strategies modified by the engagement-strategy manager module 114 from an original version, such as from an original strategy created by an engagement-system user or created by the engagement-strategy manager module 114.

The entry condition 204 describes an action, that when performed by a client device user, causes the user to become a target for receiving digital content in connection with a particular campaign. Examples of actions that may be described by the entry condition 204 include, but are not limited to, purchasing a ticket having a level that is less than a "best" level (e.g., an economy ticket when first-class tickets are still available or general admission when premium seating is still available), leaving a brick-and-mortar store without purchasing a product or service, leaving an online store without purchasing a product or service, adding a product or service to an online shopping cart without purchasing the added product or service, viewing an advertisement, interacting with digital content corresponding to a product or service for sale, signing up to receive information from a company, and so on. Clearly, the entry condition 204 may correspond to different actions relative to which delivery of digital content may be initiated for a campaign in accordance with the described techniques.

An engagement-system user (e.g., marketer) that is creating a multi-step engagement strategy via an engagement-strategy interface, or that is simply requesting via such an interface that a multi-step engagement strategy be automatically created by the engagement-strategy manager module 114, may specify the entry condition 204 in a variety of ways, such as by selecting an action via an interface instrumentality, entering text describing the action into an interface instrumentality, speaking the action to a voice-based interface, and so forth. With respect to the entry condition 204, once the described action is detected to have occurred, the learning-based engagement system 106 initiates delivery of digital content to a client device of a user that performed the described action and in accordance with the corresponding multi-step engagement strategy.

In contrast, the exit condition 206 describes an action, that when performed by a client device user, causes the user to no longer be a target for receiving digital content in connection with the particular campaign. Examples of actions that may be described by the exit condition 206 include, but are not limited to, upgrading from a lower ticket level to a higher ticket level (e.g., upgrading to a first-class ticket or premium seating), returning to a brick-and-mortar store to purchase a product or service, purchasing a product or service from an online store (e.g., associated with brick-and-mortar locations and/or limited to online sales), purchasing a product or service previously added to an online shopping cart but not previously purchased, purchasing a product or service corresponding to a viewed advertisement, purchasing a product or service corresponding to interacted-with digital content, and so on. Clearly, the exit condition 206 may correspond to different actions relative to which delivery of digital content may be ceased in connection with a campaign without departing from the described techniques.

Like the entry condition 204, a user that is creating a multi-step engagement strategy, or requesting that one be automatically created, may specify the exit condition 206 in a variety of ways via an engagement-strategy interface without departing from the spirit or scope of the techniques described herein. With respect to the exit condition 206, once the described action is detected to have occurred, the learning-based engagement system 106 may cease delivering additional digital content to client devices of a user that performed the described action, even though the additional content is scheduled for delivery according to the multi-step engagement strategy.

Broadly speaking, the content delivery manifest 208 describes a schedule for delivering digital content to users in connection with a particular campaign. In other words, the content delivery manifest 208 describes multiple different, ordered communications that are to be delivered to a client device of a user in response to the client device user performing the action described by the entry condition 204. In the illustrated example 200, the content delivery manifest 208 includes delivery 214, which represents data describing a particular content delivery to a user. The content delivery manifest 208 is also depicted with ellipses to indicate that the content delivery manifest 208 includes data describing at least one more delivery (and potentially several more deliveries). In any case, the content delivery manifest 208 describes at least two separate defined deliveries of content, such that each delivery is a "step" of the multi-step engagement strategy.

As illustrated, the delivery 214 includes delivery channel 216, content 218, day of week 220, and time of day 222. It should be appreciated that that the delivery 214 may include different information to control content delivery without departing from the spirit or scope of the techniques described herein. In scenarios where an engagement-system user creates a multi-step engagement strategy, the user may provide input via an engagement-strategy interface specifying these aspects for each delivery of the respective multi-step engagement strategy. For a first delivery, for instance, the engagement-system user may provide input via the interface to specify a channel via which the first delivery is to be delivered, particular content that is to be delivered as the first delivery, a day of the week the described content is to be delivered, and a time of day the described content is to be delivered. In such scenarios, the engagement-system user also provides input via the engagement-strategy interface to specify these aspects for at least a second delivery, and potentially more deliveries.

In scenarios where the engagement-strategy manager module 114 automatically creates a multi-step engagement strategy, however, the engagement-strategy manager module 114 determines a number of deliveries as well as the noted aspects for each delivery, e.g., using the GEM 116 and/or the CSM 118. Once determined, the engagement-strategy manager module 114 automatically generates data corresponding to each of the determined deliveries, e.g., describing the respective determined aspects. The engagement-strategy manager module 114 is also configured to aggregate the data describing the determined deliveries to form the content delivery manifest 208.

With respect to the particular aspects that control serving the delivery 214, consider first the delivery channel 216. Broadly speaking, the delivery channel 216 identifies one of a plurality of different delivery channels via which the content 218 is to be delivered. Examples of different delivery channels include email, text message (e.g., short message service (SMS)), social networking service notification (e.g., a post to appear in a user's feed of a social networking site), a mobile push notification (e.g., from a mobile application), a voicemail, a video in streaming video feed, audio in a streaming audio feed, dynamic webpage advertising spots, and so forth. Certainly, the delivery channel 216 may specify different channels via which the content 218 can be delivered without departing from the spirit or scope of the techniques described herein.

The content 218 represents the data that is to be delivered to a user in connection with the delivery 214, e.g., to convey a message such as "receive a 20% discount" or "loyalty points expiring." The content 218 may include the actual data to be delivered, and correspond to combinations of the digital content 122. In addition or alternately, the content 218 may indicate a storage location where the data to be delivered is accessible, e.g., the storage 124. By way of example, the content 218 comprises one or more digital images (e.g., included in an email or push notification), text (e.g., included as part of a text message, email, or push notification), video, audio, graphics, various combinations of such content components, and so on. The content 218 may correspond to a variety of types of digital content arranged in different ways to convey various desired messages in accordance with the described techniques.

The day of the week 220 and the time of day 222 describe "when" the content 218 is to be delivered via the delivery channel 216. The day of the week 220 represents data identifying one of Monday, Tuesday, Wednesday, Thursday, Friday, Saturday, or Sunday, and the time of day 222 identifies a time of an identified day at which the content 218 is to be delivered, e.g., 12:00 PM PT. The day of the week 220 and the time of day 222 are simply examples of data that can be used to describe when the delivery 214 is to be performed. In implementation, the delivery 214 may include other data to describe "when" to deliver the content 218, such as a date attribute specifying a month and year of the delivery 214. Alternately or in addition, the delivery 214 may simply include data corresponding to a timestamp—a single data item indicative of year, month, day, and time of day—for the delivery 214. Nonetheless, the day of the week 220 and the time of day 222 may be useful attributes for implementation of the delivery restrictions 210.

In general, the delivery restrictions 210 describe restrictions to content delivery that an engagement-system user indicates are not to occur in connection with the respective multi-step engagement strategy. By way of example, one delivery restriction may be that deliveries of content for the respective campaign are not to occur on Saturdays or Sundays; the deliveries are restricted to weekdays. To this end, the day of the week 220 attribute may be useful in indicating an allowable delivery day. Another example delivery restriction may be that deliveries of content for the respective campaign are not to occur after 9:00 PM; the deliveries are restricted in a given day to 12:00 AM to 9:00 PM. Another example may restrict channels via which content is to be delivered in connection with the respective campaign, e.g., the delivery restrictions 210 may describe that emails and SMS text messages can be used but not other forms of communication. It is to be appreciated that the delivery restrictions 210 may indicate different restrictions in accordance with the described techniques.

The engagement-strategy manager module 114 leverages these delivery restrictions 210 in scenarios where it generates a multi-step engagement strategy. The engagement-strategy manager module 114 also leverages these delivery restrictions in scenarios where an engagement-system user creates a multi-step engagement strategy via an engagement interface and selects to allow the engagement-strategy manager module 114 to modify the strategy throughout deployment. Consequently, the delivery restrictions 210 limit aspects of the deliveries the engagement-strategy manager module 114 is allowed to configure and ultimately communicate. In an example where the delivery restrictions 210 indicate that deliveries cannot be made on Sundays, for instance, the engagement-strategy manager module 114 may generate an SMS text message or email message for a user and select a day of the week for delivering the generated SMS text other than Sunday. In other words, the delivery restrictions 210 prohibit the engagement-strategy manager module 114 from delivering messages to the user on Sundays. Such delivery restrictions may also be specific to a particular user (as described by the preferences information 140) or a segment of users, as determined by the GEM 116 and the CSM 118. The delivery restrictions 210 may also be used to populate an engagement-strategy interface for assisting an engagement-system user in creating an input multi-step engagement strategy. In a similar fashion as noted above, an engagement-system user (e.g., marketer) may indicate via the user interface that deliveries cannot be made to recipient client device users on Sundays. Based on this, the engagement-strategy manager module 114 may populate interface instrumentalities that assist user-creation of individual deliveries so that Sundays are not selectable by the engagement-system user for a delivery 214.

The automatic modification selection 212 indicates whether the engagement-strategy manager module 114 is allowed to modify a multi-step engagement strategy as content is delivered in accordance therewith. In one or more implementations, the automatic modification selection 212 may be a binary indicator, such that '1' directs the engagement-strategy manager module 114 to modify the strategy and '0' directs the engagement-strategy manager module 114 not to modify the strategy. This indication may be represented in other ways without departing from the spirit or scope of the techniques described herein. In any case, an engagement-system user may provide a selection via a user interface indicating that a multi-step engagement strategy is to be modified (or not) by the engagement-strategy manager module 114. Accordingly, the automatic modification selection 212 is indicative of this selection, which is described below in relation to FIG. 4. In accordance with the described techniques, however, consider first FIG. 3.

Figure 3:
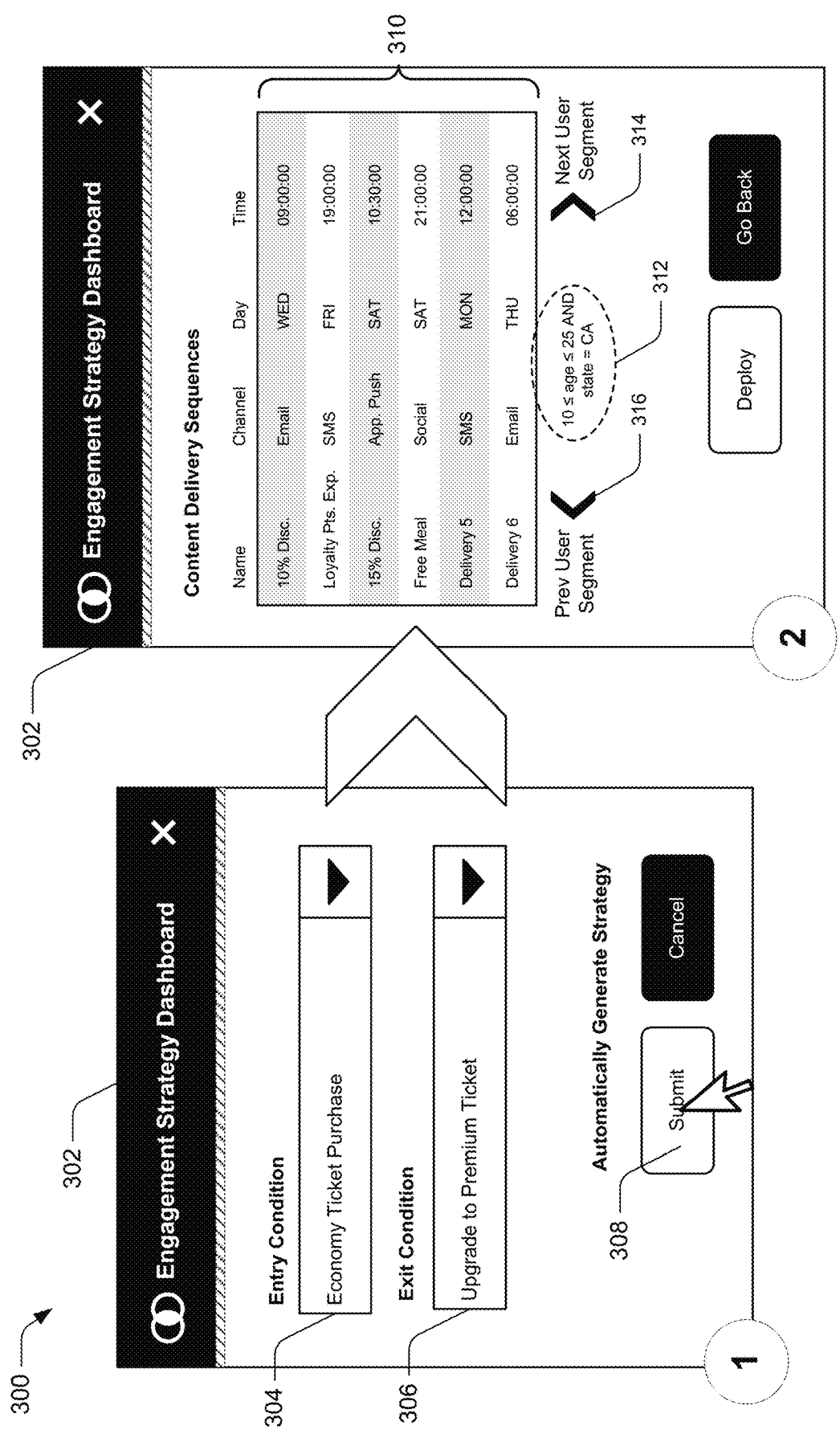
FIG. 3 depicts an example user interface via which a user provides input for entry and exit conditions that are used by the learning-based engagement system to generate and present a multi-step engagement strategy.

FIG. 3 depicts an example 300 of a user interface via which a user provides input for entry and exit conditions used by the learning-based engagement system to generate and present a multi-step engagement strategy.

The illustrated example 300 includes an engagement-strategy interface 302, which is depicted as a displayable dialog box, though other configurations are contemplated in the spirit and scope of the techniques described herein. In the illustrated example 300, the engagement-strategy interface 302 is depicted in a first stage and a second stage. These first and second stages are represented by the depicted circles numbered '1' and '2', respectively. As illustrated, the engagement-strategy interface 302 includes an entry-condition instrumentality 304, an exit-condition instrumentality 306, and a submit instrumentality 308.

The entry-condition instrumentality 304 and the exit-condition instrumentality 306 represent functionality to enable a user to specify actions for the entry condition 204 and the exit condition 206, respectively. The engagement-strategy manager module 114 supports functionality to configure the entry condition 204 and the exit condition 206 to indicate the specified actions. Though illustrated as drop-downs via which actions can be selected for use as the entry and exit conditions, the entry-condition instrumentality 304 and the exit-condition instrumentality 306 may be configured in different ways to enable a user to specify actions for the entry and exit conditions, such as configured as text entry fields, voice prompts output via a speaker in connection with a voice-based interface, and so on.

The submit instrumentality 308 represents functionality of the engagement-strategy interface to enable a user to submit the entry and exit conditions 204, 206 to the engagement-strategy manager module 114. Selection of the submit instrumentality 308 is thus effective to communicate a request to the engagement-strategy manager module 114 to generate a multi-step engagement strategy based on the entry and exit conditions 204, 206 entered via the engagement-strategy interface 302. In contrast to the scenario represented by FIG. 4, the illustrated example 300 represents a scenario in which a user does not provide input to define or schedule a sequence of deliveries. Instead, the illustrated example 300 represents a scenario in which the engagement-strategy manager module 114 uses functionality of the GEM 116 to generate a multi-step engagement strategy "from scratch". As noted above and below, the GEM 116 is trained using data describing user interactions with content delivered in connection with historical campaigns. The engagement-strategy manager module 114 also includes or has access to functionality for generating visualizations of multi-step engagement strategies produced using the GEM 116 and the CSM 118.

Visualized deliveries 310 represent a sequence of deliveries determined by the engagement-strategy manager module 114 using the GEM 116. In particular, the visualized deliveries 310 represent a sequence determined by the GEM 116 based submission of the entry and exit conditions 204, 206 as specified via the entry-condition instrumentality 304 and the exit-condition instrumentality 306. As noted above, the engagement-strategy manager module 114 leverages functionality of the interpretation module 120 to generate such visualizations. The interpretation module 120 determines user segments that the GEM 116 associates with particular multi-step engagement strategies, as described in application Ser. No. 15/812,991. In the illustrated example 300, for instance, the interpretation module 120 determines that the GEM 116 associates users from 10 to 25 and from California with a multi-segment engagement strategy having deliveries including '10% Disc.', 'Loyalty Pts. Exp.', '15% Disc.', 'Free Meal', 'Delivery 5', and 'Delivery 6'.

The engagement-strategy interface 302 also includes current user-segment indication 312 along with next and previous segment instrumentalities 314, 316. The next and previous segment instrumentalities 314, 316 enable a user to view the delivery sequences determined by the engagement-strategy manager module 114 for at least two other segments of users. Although depicted with the visualized deliveries 310, the current user-segment indication 312, the next segment instrumentality 314, and the previous segment instrumentality 316, the described systems may generate visualizations of multi-segment engagement strategies that are configured in myriad other ways without departing from the spirit or scope of the described techniques. The interpretation module 120 may also be leveraged to visualize multi-step engagement strategies that the engagement-strategy manager module 114 has modified from a user-created or from a system-created engagement strategy. This provides transparency to a user indicating how the engagement-strategy manager module 114 is carrying out content delivery for a campaign. In the context of modifying user-created engagement strategies, consider now FIG. 4.

Figure 4:
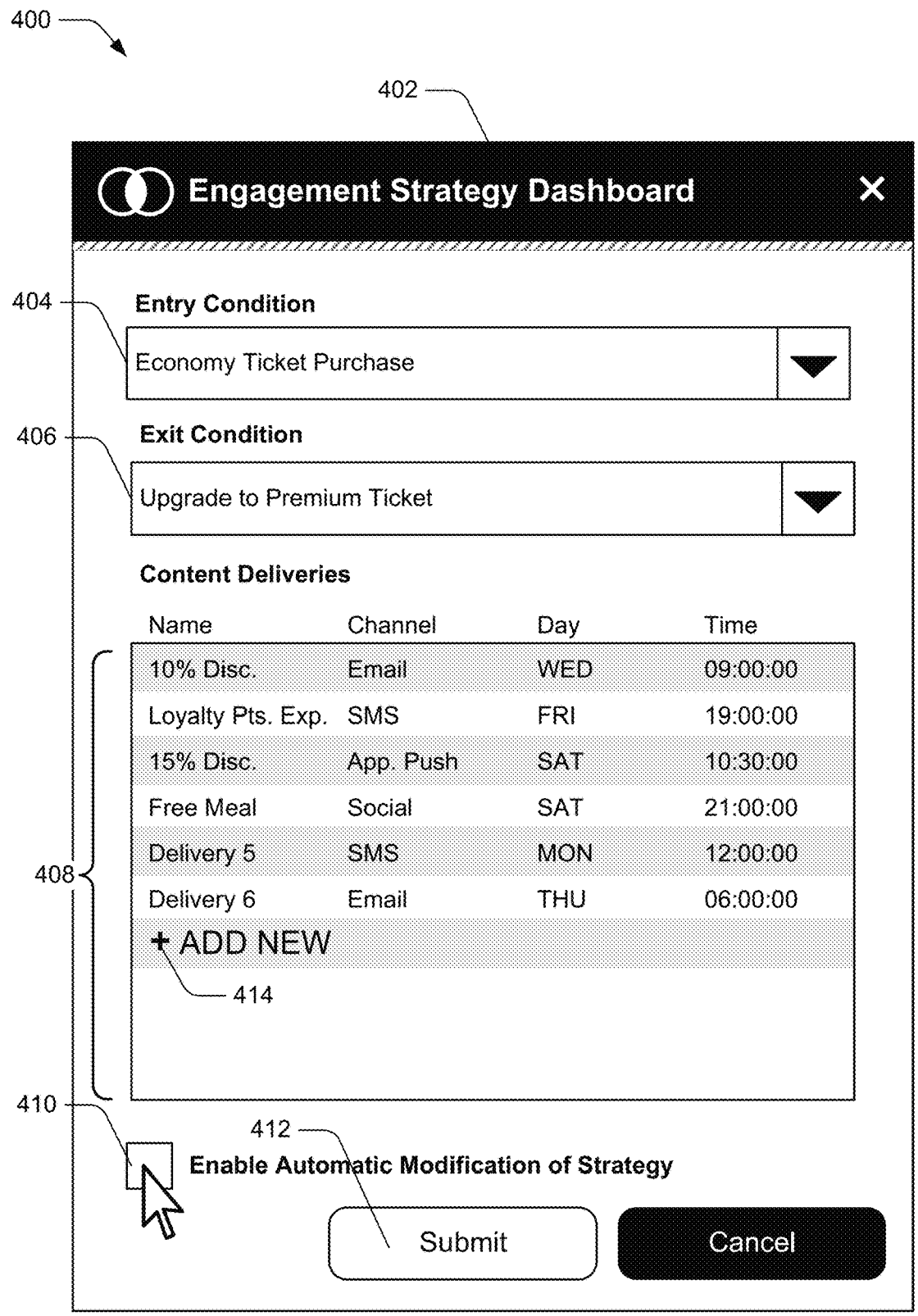
FIG. 4 depicts an example user interface via which a user can create a multi-step engagement strategy and select to enable a learning-based engagement system to generate a modified multi-step engagement strategy using machine learning.

FIG. 4 depicts an example 400 of a user interface via which a user can create a multi-step engagement strategy and select to enable a learning-based engagement system to generate a modified multi-step engagement strategy using machine learning.

The illustrated example 400 includes an engagement-strategy interface 402, which is depicted as a displayable dialog box, though other configurations are contemplated in the spirit and scope of the techniques described herein. As illustrated, the engagement-strategy interface 402 includes an entry-condition instrumentality 404, an exit-condition instrumentality 406, a delivery-defining portion 408, an automatic-modification instrumentality 410, and a submit instrumentality 412.

The entry-condition instrumentality 404 represents functionality to enable a user to specify an action for the entry condition 204. The engagement-strategy manager module 114 configures the entry condition 204 to indicate the specified action. The entry-condition instrumentality 404 is illustrated as a drop-down via which an action can be selected for use as the entry condition 204. Nevertheless, an entry-condition instrumentality may be configured in different ways to enable a user to specify an action for the entry condition 204.

Similarly, the exit-condition instrumentality 406 represents functionality to enable a user to specify an action for the exit condition 206. The engagement-strategy manager module 114 configures the exit condition 206 to indicate the specified action. The exit-condition instrumentality 406 is illustrated as a drop-down via which an action can be selected for use as the exit condition 206. Nevertheless, an exit-condition instrumentality may also be configured in different ways to enable a user to specify an action for the exit condition 206.

The delivery-defining portion 408 represents functionality to enable a user to define aspects of a delivery—to provide input for creating the deliveries 214 of the content delivery manifest 208. By way of example, the delivery-defining portion 408 includes functionality (or access to functionality) that enables a user to provide input for defining or otherwise identifying the delivery channel 216, the content 218, the day of the week 220, and the time of day 222. In one or more implementations, the delivery-defining portion 408 includes functionality that enables a user to define other aspects of a delivery, e.g., depending on a particular configuration of data corresponding to the delivery.

In the illustrated example 400, the delivery-defining portion 408 is depicted displaying at least some aspects of already-instantiated deliveries. Here, the already-instantiated deliveries include '10% Disc.', 'Loyalty Pts. Exp.', '15% Disc.', 'Free Meal', 'Delivery 5', and 'Delivery 6'. Each of these represent a separate delivery 214 of a content delivery manifest 208. Although not specifically shown, the delivery-defining portion 408 also includes functionality or access to functionality to enable a user to modify aspects of a delivery, such as to change a channel, day, time, and so forth. The delivery-defining portion 408 also includes add new instrumentality 414, which represents functionality to add an additional delivery 214 to the content delivery manifest 208.

Broadly speaking, the deliveries depicted in the delivery-defining portion 408 represent user-defined deliveries for a single campaign. Collectively, these defined deliveries are a multi-step engagement strategy for the campaign, leveraged after occurrence of a defined entry condition and carried out until occurrence of a defined exit condition. In addition or alternately, the delivery-defining portion 408 may include deliveries for multiple different campaigns and/or multiple different user segments, e.g., males from Texas and females from California. In such implementations, the delivery-defining portion 408 may also display an indication of the respective campaign and/or user segment. Such arrangements enable a user to easily create similar deliveries for different campaigns and/or segments, such as by copying a delivery already created for a first campaign and then simply providing input to change an identifier of the respective campaign from the first campaign to a second campaign. In any case, the engagement-strategy interface 402 can be configured with a variety of functionality to enable users to create deliveries for a campaign controlled by a multi-step engagement strategy without departing from the spirit or scope of the described techniques.

The automatic-modification instrumentality 410 represents functionality of the engagement-strategy interface 402 to enable a user to specify that a multi-step engagement strategy is to be modified during deployment by the engagement-strategy manager module 114. In the illustrated example 400, the automatic-modification instrumentality 410 is depicted as a check box. Thus, when user input is received to "check" the check box, the engagement-strategy manager module 114 configures the automatic modification selection 212 to indicate that the respective multi-step engagement strategy is to be dynamically modified during deployment. It follows that when the check box is not "checked," the engagement-strategy manager module 114 configures the automatic modification selection 212 to indicate that the respective multi-step engagement strategy is not to be modified during deployment. The automatic-modification instrumentality 410 may be configured in different ways to enable a user to specify that a multi-step engagement strategy is to be modified during deployment by the engagement-strategy manager module 114 without departing from the spirit or scope of the described techniques.

The submit instrumentality 412 represents functionality of the engagement-strategy interface 402 to enable a user to deploy a defined multi-step engagement strategy. Responsive to selection of the submit instrumentality 412, for instance, the engagement-strategy manager module 114 deploys the defined multi-step engagement strategy. When a selection is received indicating to modify the strategy, the engagement-strategy manager module 114 modifies the multi-step engagement strategy during deployment. With regard to modification of a multi-step engagement strategy during deployment, consider FIG. 5.

Figure 5:
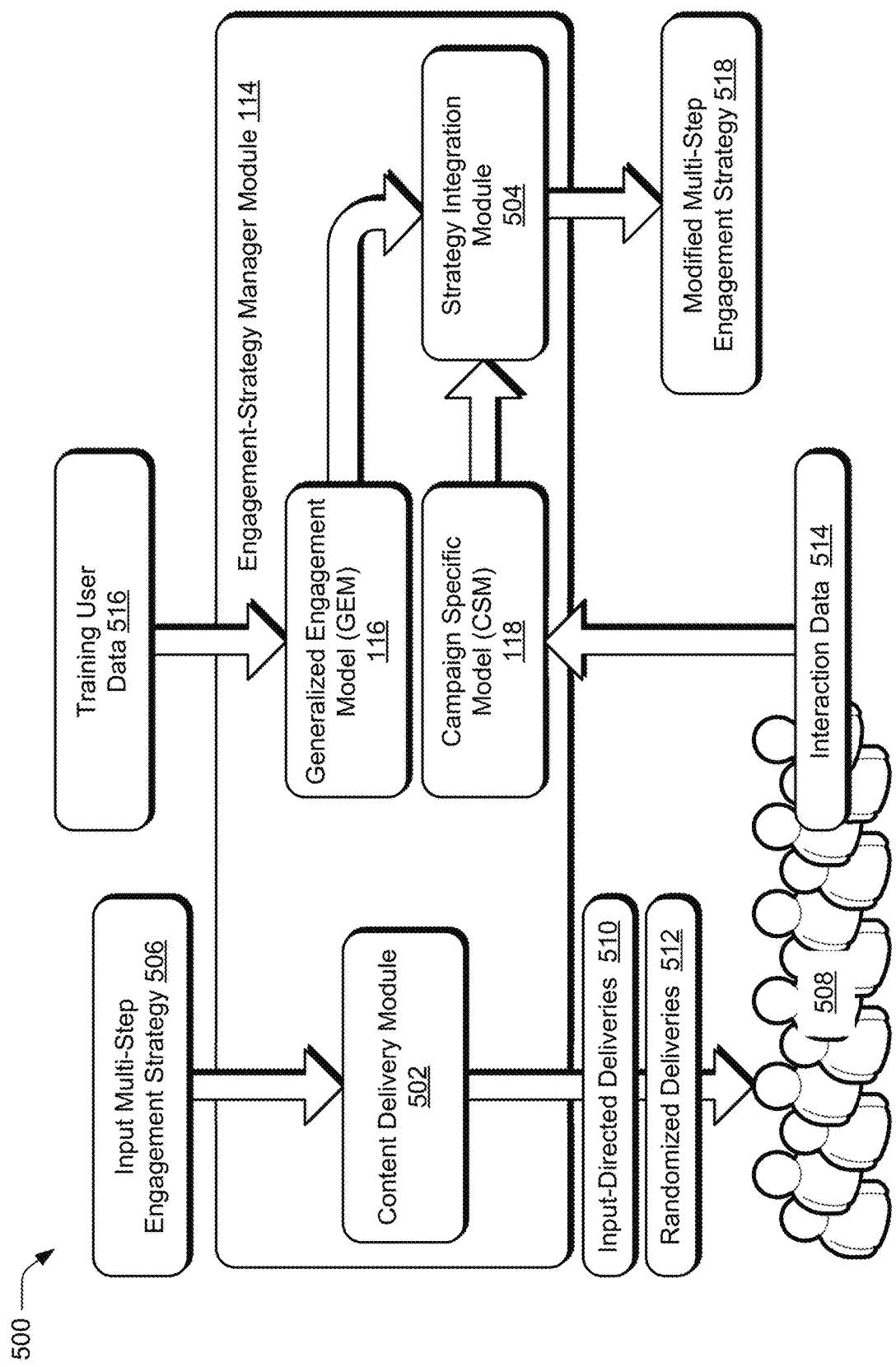
FIG. 5 depicts an example implementation in which the learning-based engagement system of FIG. 1 generates a modified multi-step engagement strategy using machine learning from an input multi-step engagement strategy.

FIG. 5 depicts an example implementation 500 in which a learning-based engagement system of FIG. 1 generates a modified multi-step engagement strategy using machine learning from an input multi-step engagement strategy.

The illustrated example 500 includes from FIG. 1 the engagement-strategy manager module 114 of the learning-based engagement system 106. As depicted in the environment of FIG. 1, the engagement-strategy manager module 114 also includes the generalized engagement model 116 (GEM 116) and the campaign specific model 118 (CSM 118). In this example 500, the engagement-strategy manager module 114 also includes content delivery module 502 and strategy integration module 504. In implementation, the engagement-strategy manager module 114 may include or have access to more or fewer modules and machine-learning models to carry out the described functionality without departing from the spirit or scope of the techniques described herein. By way of example, the functionality represented by the GEM 116, the CSM 118, and the strategy integration module 504 may be combined into a single module or distributed among multiple additional modules in accordance with the described techniques.

Regardless of the implementation details, the engagement-strategy manager module 114 is depicted receiving input multi-step engagement strategy 506 as input. The input multi-step engagement strategy 506 may be created according to user input specifying details of content deliveries or created by the GEM 116 based on user input specifying simply entry and exit conditions of a campaign (content delivery restrictions may be specified also)—but not specifying details of content deliveries. In particular, the content delivery module 502 is depicted receiving the input multi-step engagement strategy 506 as input. In accordance with the described techniques, the input multi-step engagement strategy 506 corresponds to multi-step engagement strategy data 202 describing a multi-step engagement strategy that is created by an engagement-system user, e.g., via the engagement-strategy interface 402. In other words, the input multi-step engagement strategy 506 describes content deliveries where delivery aspects are defined according to user input. These contrast with content deliveries where the delivery aspects are defined according to determinations (e.g., of channel, day, and time) made by the engagement-strategy manager module 114.

The content delivery module 502 represents functionality to deliver content to recipient client device users 508 (recipients 508), at least in part, according to the input multi-step engagement strategy 506. In accordance with the described techniques, the recipients 508 represent client device users that have performed the action indicated by the entry condition 204 of the input multi-step engagement strategy 506, e.g., users that have purchased an economy class ticket.

As noted just above, the content delivery module 502 delivers at least some content to the recipients 508 in accordance with the input multi-step engagement strategy 506. Such deliveries are represented by input-directed deliveries 510. These input-directed deliveries 510 are delivered according to the content delivery manifest 208 corresponding to the input multi-step engagement strategy 506. Thus, each input-directed delivery 510 corresponds to a delivery 214 and is delivered according to the defined delivery channel 216, defined content 218, defined day of the week 220, and defined time of day 222.

Although a user that created the input multi-step engagement strategy 506 may define deliveries and schedule them based on his or her domain knowledge, the deliveries may not be delivered and/or scheduled in a way that optimizes performance of the exit condition 206 among the recipients. In other words, the input multi-step engagement strategy 506 may not be the optimal strategy for having the most recipients 508 perform the action indicated by the exit condition 206. Instead, a different engagement strategy may cause more of the recipients 508 to perform the action indicated by the exit condition 206 than the input multi-step engagement strategy 506. When a selection is made to automatically modify the input multi-step engagement strategy 506, the engagement-strategy manager module 114 is leveraged to find such a different strategy. In particular, the engagement-strategy manager module 114 is leveraged to determine an optimized multi-step engagement strategy, e.g., a strategy predicted to cause more of the recipients 508 to perform the action defined by the exit condition 206 than any other strategy.

As part of determining an optimal multi-step engagement strategy, the content delivery module 502 also changes in a randomized fashion some of the delivery aspects defined by the user. These deliveries are represented by randomized deliveries 512. For the randomized deliveries 512, the content delivery module 502 determines various aspects of the user-scheduled deliveries to randomly modify. If the input multi-step engagement strategy 506 describes delivering to a particular type of user a first email, then a second email, and then an SMS text, for instance, the content delivery module 502 may randomly determine to instead deliver the SMS text and then the first and second emails to the particular user. Alternately or in addition, the content delivery module 502 may randomly determine to deliver content at different times than described by the input multi-step engagement strategy 506, or on different days, or via different channels, or to add more deliveries than described, and so forth.

In any case, the content delivery module 502 serves the randomized deliveries 512 so that those deliveries deviate in some way from the deliveries defined by the input multi-step engagement strategy 506. The purpose of the randomized deliveries 512 is to explore whether content may be delivered in other ways than described by the input multi-step engagement strategy 506 that are more effective at causing the exit condition 206 among the recipients 508. The randomized deliveries 512 enable the engagement-strategy manager module 114 to observe how the recipients 508 interact with content delivered with randomly changed aspects relative to the input-directed deliveries 510. Initially, the content delivery module 502 delivers a first portion of the respective campaign's content with the input-directed deliveries 510 and a second portion with the randomized deliveries 512. By way of example, the content delivery module 502 may initially deliver 80% of the campaign's content as the input-directed deliveries 510 and 20% as the randomized deliveries 512. The content delivery module 502 may deliver the campaign's content in this way as part of an "exploration" phase. As the engagement-strategy manager module 114 determines and deploys an optimal multi-step engagement strategy for the campaign, though, the amount of randomized deliveries 512 may be reduced. Further, the input-directed deliveries 510 are replaced by system-directed deliveries (not shown), which are delivered according to the determined optimal engagement strategy. Records of these content deliveries may be maintained in the delivery log 142 data depicted in the illustrated environment 100.

Regardless of whether the content is delivered via an input-directed delivery 510 or a randomized delivery 512, the recipients 508 interact with those deliveries. By "interact," it is meant that the recipients 508 perform some action or series of actions in relation to the input-directed deliveries 510 and the randomized deliveries 512. Such interactions may include, for instance, opening the content of a delivery (e.g., an email), deleting the delivery without opening the content, deleting the delivery after opening the content without other actions, interacting with (e.g., selecting a portion of, viewing for a period of time, or listening for a period of time) the opened content, forwarding the delivery to another client device user, screen capturing the content of the delivery, selecting a portion of the delivered content to navigate to a web page or launch an application, performing the action described by the exit condition 206, performing a negative action such as selecting an "unsubscribe" link, and so forth.

Interaction data 514 describes these actions performed by the recipients 508 in relation to the input-directed deliveries 510 and the randomized deliveries 512 (and later system-directed deliveries). This interaction data 514 may be collected by the client devices leveraged by the recipients 508 and communicated to the engagement-strategy manager module 114 as the interactions occur. Techniques for collecting such data include insertion of tracking pixels, click-stream data, cookies, and so on. In accordance with the described techniques, this interaction data 514 is one example of the tracking data 144. To this end, data describing the deliveries made by the content delivery module 502 is captured in the delivery log 142, and the interaction data 514 describing interactions of the recipients 508 with those deliveries is captured in the tracking data 144.

In the illustrated example 500, the interaction data 514 and training user data 516 are depicted as input to the CSM 118 and the GEM 116, respectively. The interaction data 514 and the training user data 516 both correspond to at least portions of the user data 132. Although depicted receiving the interaction data 514, which may correspond to a portion of the delivery log 142 and the tracking data 144 of the recipients 508, other user data 132 associated with the recipients 508 may be provided to the CSM 118, such as the demographic information 138 and the preferences information 140. Broadly speaking, the training user data 516 represents historical data describing client device users and their interactions with historical content delivery campaigns, e.g., prior to deployment of the input multi-step engagement strategy 506. In contrast, the interaction data 514 represents data collected during the campaign corresponding to the input multi-step engagement strategy 506, which is increasingly controlled over its deployment by modified multi-step engagement strategy 518.

As noted above, the GEM 116 represents functionality to generate multi-step engagement strategies for different users (e.g., users corresponding to different segments) based on historical user data. Broadly speaking, the engagement-strategy manager module 114 trains the GEM 116 with the training user data 516 of multiple historical campaigns. Additionally, the engagement-strategy manager module 114 updates the GEM 116 as engagement strategies of campaigns are deployed. In so doing, the GEM 116 learns aspects of engagement strategies which cause them to be effective at achieving particular objectives. The GEM 116 also learns aspects of engagement strategies which cause them not to be effective at achieving particular objectives. In this way, the GEM 116 may be leveraged to predict information indicative of strategies that are effective across any campaign.

To this end, the training user data 516 includes the delivery logs 142 and the tracking data 144 of multiple users for these multiple historical campaigns. The engagement-strategy manager module 114 trains the GEM 116 based on the content delivered according to the delivery logs 142 and the user interactions with the delivered content as described by the tracking data 144. The tracking data 144 indicates interactions with delivered content that resulted in achievement of an exit condition, e.g., "successful" interactions. The tracking data 144 also indicates the interactions with the delivered content that did not result in achievement of the exit condition, e.g., "unsuccessful" interactions. The engagement-strategy manager module 114 associates delivered content with interactions as described by the delivery logs 142 and the tracking data 144, respectively. The engagement-strategy manager module 114 then converts these content-action pairs to data (e.g., feature vectors) that can be used to train a machine-learning model, such as neural network, random forest, or regression model. The engagement-strategy manager module 114 uses these content-action pairs to train the GEM 116. As output, the GEM 116 provides a strategy for targeting a recipient of a particular user segment given a campaign objective.

In contrast to the GEM 116, the CSM 118 is built and deployed for a single campaign. Thus, the CSM 118 receives data specific to client device users that receive content delivered as part of the campaign and specific to interactions of those client device users with the content delivered as part of the campaign. During deployment of this campaign, the engagement-strategy manager module 114 continues to update the CSM 118 as the recipients 508 interact with the delivered content. However, the CSM 118 is limited in use to the particular campaign, such that for different campaigns the engagement-strategy manager module 114 uses different campaign specific models trained with interaction data of the respective campaign. For these different campaigns, however, the engagement-strategy manager module 114 uses the GEM 116. Regardless, as part of continually training the CSM 118 during a respective campaign, the engagement-strategy manager module 114 also creates content-action paired data. This paired data is similar to the paired data described above in relation to the GEM 116, but in contrast is limited to data corresponding to the respective campaign.

In accordance with the described techniques, the engagement-strategy manager module 114 may also determine segments for different users, e.g., based on the demographic information 138 and the preferences information 140. The engagement-strategy manager module 114 uses these determined segments for training the GEM 116 and the CSM 118 along with the content-action paired data.

The strategy integration module 504 represents functionality to combine the outputs of the GEM 116 and the CSM 118. For example, when the output of these models is a vector from each indicative of a multi-step engagement strategy for delivering content to a user segment, the strategy integration module 504 combines these two vectors into a single vector indicative of one multi-step engagement strategy. By combining the outputs of the GEM 116 and the CSM 118, the strategy integration module 504 outputs the modified multi-step engagement strategy 518. In one or more implementations, the modified multi-step engagement strategy 518 controls content delivery to a single segment of the recipients 508, such as a segment corresponding to females between 20 and 24 from California or a segment corresponding to males between 30 and 34 from Texas.

In summary, the GEM 116 outputs a multi-step engagement strategy for a given user segment based on being trained with the training user data 516 from multiple historical campaigns. In one or more implementations, the CSM 118 may also output a multi-step engagement strategy for the given user segment. However, the CSM 118 may do so based on the output of the GEM 116 and also based on training involving the interaction data 514. The modified multi-step engagement strategy 518 is used by the content delivery module 502 to deliver content of a respective campaign to the recipients 508. Over a life of the campaign, the input multi-step engagement strategy 506 is used increasingly less and the modified multi-step engagement strategy 518 is used increasingly more effective to reduce a number of the input-directed deliveries 510 relative to the system-directed deliveries (delivered according to the modified multi-step engagement strategy 518). Consider the following implementation example in accordance with the described techniques.

Initially, the content delivery module 502 leverages an epsilon-greedy traffic allocation strategy to determine an amount of deliveries to select as the input-directed deliveries 510, an amount to select as the randomized deliveries 512, and an amount to select as system-directed deliveries. In practice, this means that with a first probability of epsilon (e.g., 0.2) a given recipient 508 will be served content determined by the engagement-strategy manager module 114, e.g., determined using the outputs of the GEM 116 and the CSM 118 rather than be served content in accordance with the input multi-step engagement strategy 506. These deliveries correspond to the system-directed deliveries. Further, with a second probability of one minus epsilon (e.g., 1-0.2), a given recipient 508 will be service content according to the input multi-step engagement strategy 506. These correspond to the input-directed deliveries 510.

During the course of the campaign, the content delivery module 502 serves the randomized deliveries 512 with a probability equal to beta. As discussed above, these randomized deliveries 512 allow the engagement-strategy manager module 114 to observe interactions with content deliveries that are different from those specified by a user that created the input multi-step engagement strategy 506. The observed interactions with the randomized deliveries 512 are captured in data as described above—this allows a data set to be built describing the interactions with the deliveries different from those specified by the user.

Continuing with this implementation example, the engagement-strategy manager module 114 trains a neural network configured as the CSM 118. In particular, the engagement-strategy manager module 114 trains the CSM 118 to receive a given user state as input and, based on this input, generate a prediction of a multi-step engagement strategy that maximizes future reward as output. In this implementation example, the data set used to train the CSM 118 comprises a set of "episodes," where each episode comprises a sequence of actions taken by a recipient to which content is delivered. Each of these episodes is also associated with a reward. In this implementation example, the rewards are associated with the episodes as follows though rewards may be associated with sequences of actions for training differently in different implementations. A reward of positive one (+1) is associated with an episode if the respective user performs the action described by the exit condition 206 at the end of the episode. A reward of zero (0) is associated with an episode if the respective user does not perform the action described by the exit condition 206 and also does not perform a negative action. A reward of negative one (−1)—a penalty—is associated with an episode if the respective user does not perform the exit-condition action, but does perform a negative action, such as unsubscribing to an email distribution list, deleting an account with a service, and so forth. The CSM 118 may be flexible insofar as using a different reward structure may incentivize different types of optimization strategies.

The engagement-strategy manager module 114 uses these training episodes to train the CSM 118 to generate a prediction comprising a probability vector of actions, given a current state of a recipient 508 as input. The current state corresponds to characteristics of the recipient 508 as described by the user data 132, e.g., location, products purchased on a corresponding website, demographic information, preferences information, delivered content, interactions therewith, and so forth.

In addition to training the CSM 118, the content delivery module 502 serves a first portion of users content according to the output of the CSM 118 (e.g., according to the modified multi-step engagement strategy 518) and a second portion of the users content according to the input multi-step engagement strategy 506. The portion served content according to the output of the CSM 118 is based on a rate at which the recipients perform the action described by the exit condition 206, such that the content delivery module 502 serves more recipients 508 content according to the CSM 118's output for higher "conversion" rates. Accordingly, as the CSM 118 learns user behavior patterns—based on observing user interaction with the delivered content as described by the interaction data 514—the first portion of users increases toward all the recipients being served the content according to the CSM 118's output.

Finally, the randomness introduced by this greedy-epsilon process during training allows the CSM 118 and thus the engagement-strategy manager module 114 to capture changing user trends, e.g., in ways users interact with delivered content. This is because the exploration of random aspects of content delivery allows the engagement-strategy manager module 114 to determine alternative strategies that are useful in practice which a user creating the multi-step engagement strategy may not have considered in its creation.

Having discussed example details of the techniques for machine-learning based multi-step engagement strategy generation and visualization, consider now some example procedures to illustrate additional aspects of the techniques.

Example Procedures

This section describes example procedures for machine-learning based multi-step engagement strategy generation and visualization in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the learning-based engagement system 106 of FIG. 1 that makes use of an engagement-strategy manager module 114, including use of its GEM 116 and CSM 118.

Figure 6:
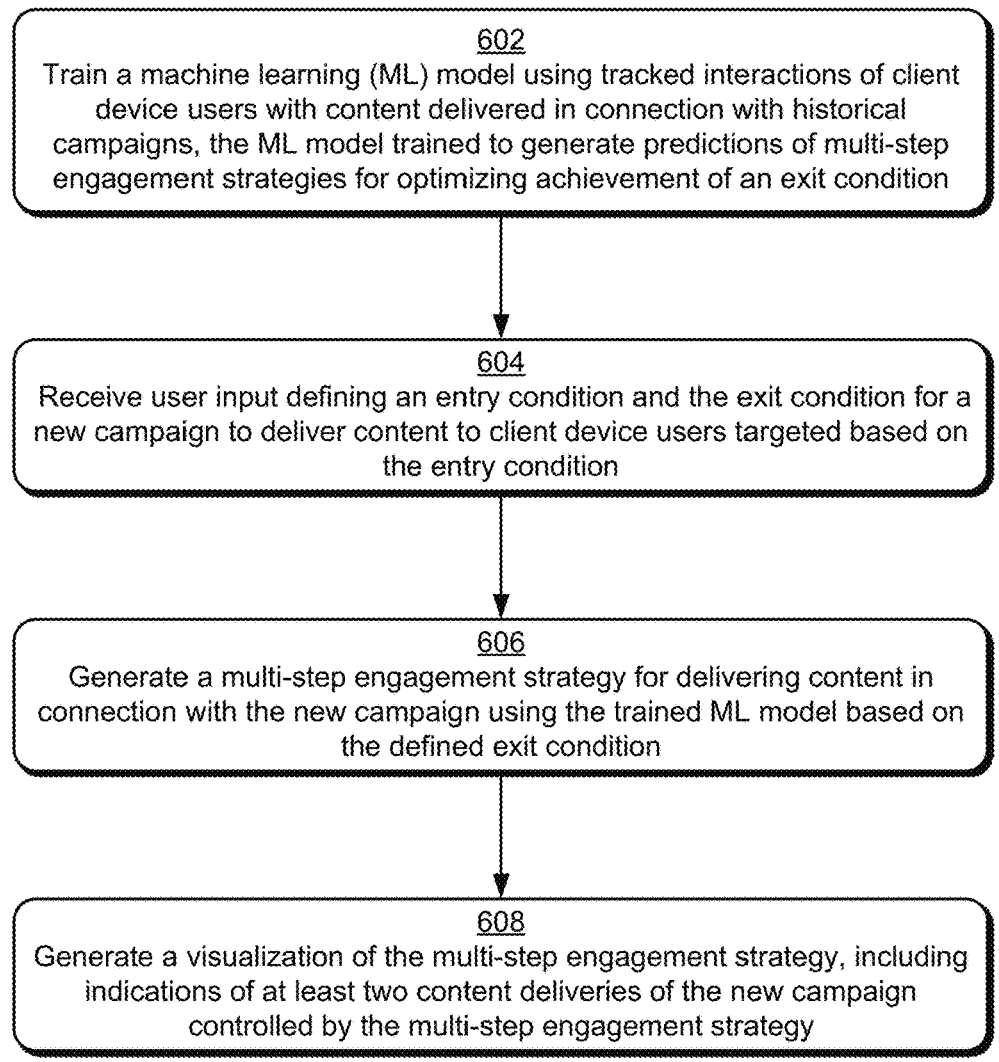
FIG. 6 depicts a procedure in an example implementation in which a multi-step engagement strategy is visualized for display via a user interface.

FIG. 6 depicts an example procedure 600 in which a multi-step engagement strategy is created using machine learning and visualized for display via a user interface.

A machine-learning model is trained using tracked interactions of client device users with content delivered in connection with historical campaigns (block 602). In accordance with the principles discussed herein, the machine-learning model is trained to generate predictions of multi-step engagement strategies for optimizing achievement of an exit condition. By way of example, the engagement-strategy manager module 114 trains the generalized engagement model 116 (GEM 116) using the delivery logs 142 and the tracking data 144 of the user data 132. In one or more implementations, the engagement-strategy manager module 114 trains the GEM 116 in accordance with the training described in above-noted and incorporated application Ser. No. 15/812,991. By way of example, the engagement-strategy manager module 114 trains the GEM 116, in accordance with the training described in application Ser. No. 15/812,991, to predict a class corresponding to one of a plurality of predictable multi-step engagement strategies based on input data describing a user state.

User input is received that defines an entry condition and the exit condition for a new campaign (block 604). In accordance with the principles discussed herein, this new campaign is to be created for delivering content to client device users targeted based on the entry condition. By way of example, the computing device 104 presents the engagement-strategy interface 302, and receives input via the engagement-strategy interface 302 to define the entry condition 204 and the exit condition 206 for a new campaign. The engagement-strategy manager module 114 receives the entry condition 204 and the exit condition 206 from the computing device 104.

A multi-step engagement strategy is generated for delivering content in connection with the new campaign using the trained machine-learning model based on the defined exit condition (block 606). By way of example, the engagement-strategy manager module 114 uses the GEM 116 to generate a multi-step engagement strategy for the new campaign based on the exit condition 206 defined at block 604.

A visualization of the multi-step engagement strategy is generated (block 608). In accordance with the principles discussed herein, the visualization is generated for display via a user interface and includes indications of at least two content deliveries of the new campaign that are controlled by the multi-step engagement strategy. By way of example, the engagement-strategy manager module 114 generates a visualization of the multi-step engagement strategy generated at block 606. With reference to application Ser. No. 15/812,991, the engagement-strategy manager module 114 generates these visualizations, in part, by leveraging generated rules indicative of user segments and predicted segment classifications, e.g., 'IF 10≤age<25 AND state=California THEN Predict class_1'. Here, 'class_1' corresponds to a particular multi-step engagement strategy. In one or more implementations, this visualization is configured in a similar manner to the visualized deliveries 310 of the engagement-strategy interface 302, insofar as it includes indications of at least two content deliveries of the new campaign that are controlled by the multi-step engagement strategy generated at block 606. In this scenario, the engagement-strategy interface 302 also includes instrumentalities to navigate through the visualized deliveries 310 for different users and/or user segments.

Certainly, the at least two content deliveries of this new campaign may be visualized in other ways without departing from the spirit or scope of the described techniques. The engagement-strategy manager module 114 communicates the generated visualization to the computing device 104 for output, e.g., display. It is to be appreciated that the engagement-strategy manager module 114 is capable of generating visualizations of user-created multi-step engagement strategies, visualizations of multi-step engagement strategies that are created by the engagement-strategy manager module 114 based on input of the entry condition 204 and the exit condition 206, visualizations of multi-step engagement strategies that the engagement-strategy manager module 114 modifies from user-created multi-step engagement strategies, and so forth.

Having described example procedures in accordance with one or more implementations, consider now an example system and device that can be utilized to implement the various techniques described herein.

Example System and Device

Figure 7:
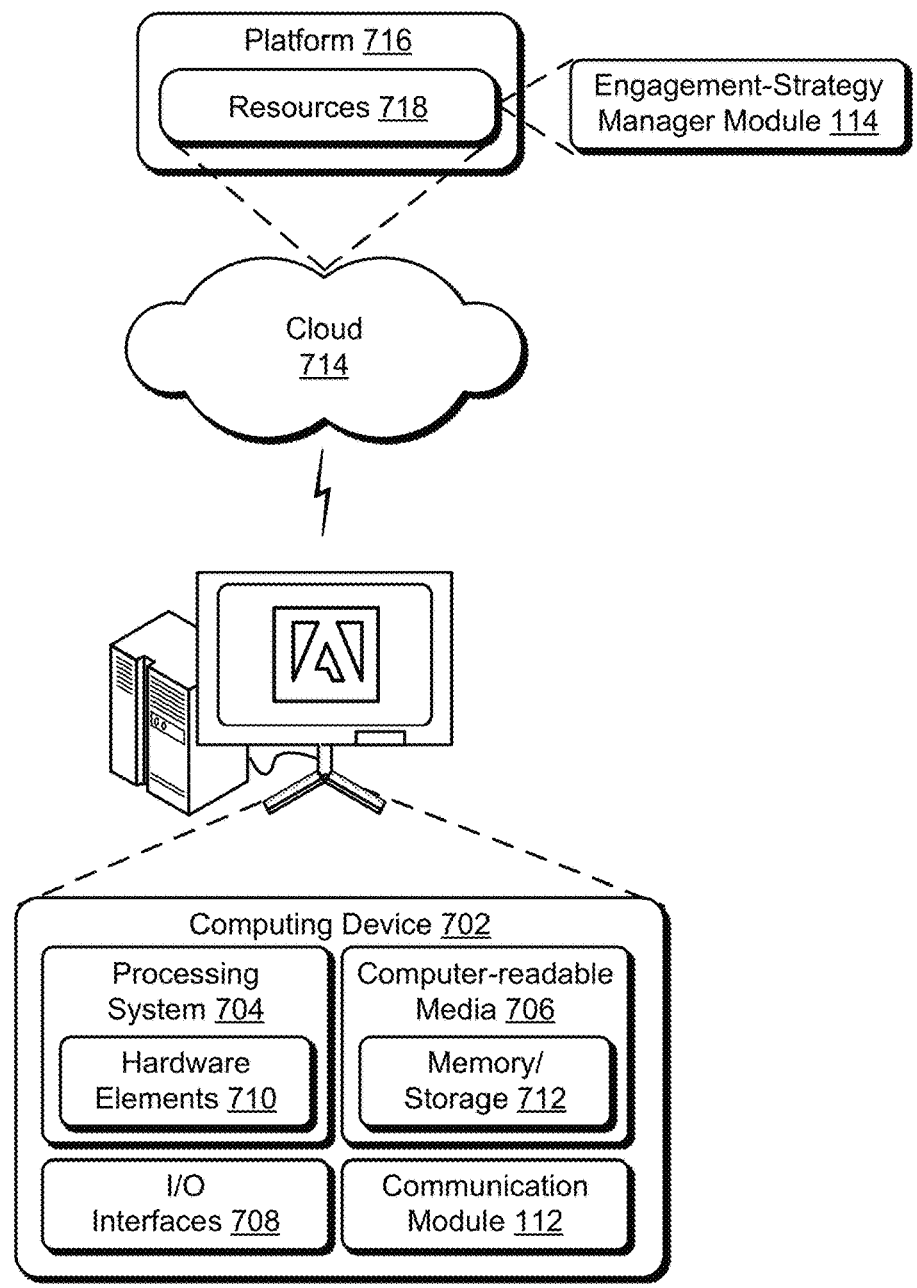
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the engagement-strategy manager module 114 and the communication module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to cause targeted client device users to perform a desired action, a method implemented by at least one computing device, the method comprising:
    receiving a request from an engagement-system user for a multi-step engagement strategy used to control delivery of content associated with a campaign, the request limited to an entry condition and an exit condition for the campaign, the entry condition limited to describing an action performed by a client device user that causes the client device user to be targeted by the campaign, and the exit condition describing an additional action performed by the client device user that causes the client device user to no longer be targeted by the campaign;
    training a machine learning model with data describing interactions of client device users with content delivered in connection with at least one historical campaign;
    generating, using the machine-learning model and without further input from the engagement-system user, a prediction of the multi-step engagement strategy that optimizes performance of the exit condition across the client device users targeted by the campaign responsive to satisfying the entry condition, the multi-step engagement strategy describing a sequence of content deliveries to at least one client device user targeted by the campaign; and
    controlling the delivery of content associated with the campaign, in part, by serving the sequence of content deliveries to the at least one client device user targeted by the campaign as described by the multi-step engagement strategy.

2. A method as described in claim 1, wherein the multi-step engagement strategy describes aspects of the sequence of content deliveries, including at least one of:
    a number of the content deliveries in the sequence;
    a delivery channel for delivering each of the content deliveries in the sequence;
    a day of a week for delivering each of the content deliveries in the sequence;
    a time of day for delivering each of the content deliveries in the sequence; or
    a combination of content components included in each of the content deliveries in the sequence.

3. A method as described in claim 2, wherein the delivery channel comprises one of a plurality of channels including at least one of email, short message service (SMS) text message, mobile-device push notifications, social networking service instrumentalities, video in a streaming video feed, audio in a streaming audio feed, or dynamic webpage advertising spots.

4. A method as described in claim 1, wherein the entry condition is specified by the engagement-system user via a user interface.

5. A method as described in claim 1, wherein the exit condition is specified by the engagement-system user via a user interface.

6. A method as described in claim 1, further comprising generating a visualization of the multi-step engagement strategy, the visualization including visual indications of the content deliveries in the sequence.

7. A method as described in claim 6, further comprising communicating the visualization for output to a computing device of the engagement-system user associated with the request.

8. A method as described in claim 6, wherein the visual indications indicate delivery aspects of a respective content delivery.

9. A method as described in claim 8, wherein the delivery aspects include at least one of a delivery channel for delivering the respective content delivery, a date for delivering the respective content delivery, a time of day for delivering the respective content delivery, or a message of the respective content delivery.

10. A method as described in claim 1, wherein the entry condition and the exit condition are specified by user input of the engagement-system user, and the user input of the engagement-system user is limited to submission of the entry condition and the exit condition.

11. A system comprising:
    an engagement-strategy manager module implemented at least partially in hardware of at least one computing device to receive a request from an engagement-system user for a multi-step engagement strategy that controls delivery of content associated with a campaign, the request limited to an entry condition and an exit condition, the entry condition limited to describing an action performed by a client device user that causes the client device user to be targeted by the campaign, and the exit condition describing an additional action performed by the client device user that causes the client device user to no longer be targeted by the campaign; and
    a machine-learning model implemented at least partially in the hardware of the at least one computing device to generate, without further input from the engagement-system user, a prediction of the multi-step engagement strategy that optimizes performance of the exit condition across client device users that are targeted by the campaign based on satisfying the entry condition, the multi-step engagement strategy describing a sequence of content deliveries for at least one of the client device users targeted by the campaign.

12. A system as described in claim 11, wherein the engagement-strategy manager module is further configured to generate visualizations of the multi-step engagement strategy, the visualizations including visual indications of the content deliveries in the sequence.

13. A system as described in claim 11, wherein the engagement-strategy manager module is further configured to communicate a generated visualization to a computing device of the engagement-system user associated with the request.

14. A system as described in claim 11, wherein the engagement-strategy manager module is further configured to cause delivery of the sequence of content deliveries to a respective client device of the at least one client device user targeted by the campaign.

15. A system as described in claim 11, wherein the multi-step engagement strategy further describes an additional sequence of content deliveries for at least one additional user of the client device users targeted by the campaign.

16. A system as described in claim 15, wherein the engagement-strategy manager module is further configured to cause delivery of the additional sequence of content deliveries to a respective client device of the at least one additional user.

17. A system as described in claim 11, wherein the engagement-strategy manager module is further configured to receive an additional request for an additional multi-step engagement strategy that controls delivery of content associated with an additional campaign, the additional request limited to a respective entry condition, a respective exit condition, and at least one campaign delivery restriction that restricts the delivery of content associated with the additional campaign.

18. A system as described in claim 17, wherein the engagement-strategy manager module is further configured to generate the additional multi-step engagement strategy to describe only sequences of content deliveries that are not restricted by the at least one campaign delivery restriction.

19. In a digital medium environment to inform a user of an engagement system how the engagement system controls delivery of content associated with a campaign, a method implemented by at least one computing device, the method comprising:

receiving, via a user interface presented for an engagement-system user, input to request generation of a multi-step engagement strategy for controlling delivery of content associated with the campaign, the input limited to submission of an entry condition and an exit condition, the entry condition limited to describing an action performed by a client device user that causes the client device user to be targeted by the campaign, and the exit condition describing an additional action performed by the client device user that causes the client device user to no longer be targeted by the campaign;

communicating the request to the engagement system;

receiving, without further input from the engagement-system user, a visualization of the multi-step engagement strategy generated by the engagement system, the multi-step engagement strategy describing a sequence of content deliveries to at least one client device user targeted by the campaign and determined using a machine learning model, the visualization including visual indications corresponding to the sequence of content deliveries described by the multi-step engagement strategy; and presenting, via the user interface, the visualization.

20. A method as described in claim 19, wherein the visualization further includes a user segment indication that indicates a user segment determined for the at least one client device user from a plurality of user segments by the engagement system.

\* \* \* \* \*